(12) United States Patent
Frank

(10) Patent No.: US 7,092,266 B2
(45) Date of Patent: Aug. 15, 2006

(54) CIRCUIT ARRANGEMENT FOR SUPPLYING VOLTAGE TO A LOAD

(75) Inventor: Wolfgang Frank, Augsburg (DE)

(73) Assignee: Infineon Technologies AG, Munich (DE)

( * ) Notice: Subject to any disclaimer, the term of this patent is extended or adjusted under 35 U.S.C. 154(b) by 116 days.

(21) Appl. No.: 10/869,500

(22) Filed: Jun. 16, 2004

(65) Prior Publication Data

US 2005/0035661 A1 Feb. 17, 2005

(30) Foreign Application Priority Data

Jun. 20, 2003 (DE) ................................ 103 27 956

(51) Int. Cl.
*H02M 1/00* (2006.01)
(52) U.S. Cl. ....................................................... 363/65
(58) Field of Classification Search ................. 363/65; 307/64, 66
See application file for complete search history.

(56) References Cited

U.S. PATENT DOCUMENTS

| | | | | |
|---|---|---|---|---|
| 5,465,011 A | * | 11/1995 | Miller et al. .................. 307/64 |
| 5,612,581 A | | 3/1997 | Kageyama | |
| 5,760,495 A | * | 6/1998 | Mekanik ....................... 307/66 |
| 6,122,181 A | * | 9/2000 | Oughton, Jr. ................. 363/37 |
| 6,281,602 B1 | * | 8/2001 | Got et al. ...................... 307/66 |
| 6,441,590 B1 | * | 8/2002 | Amantea et al. ............ 323/266 |
| 6,459,175 B1 | * | 10/2002 | Potega ........................ 307/149 |
| 6,465,910 B1 | * | 10/2002 | Young et al. .................. 307/64 |

OTHER PUBLICATIONS

Herfurth, M., "TDA 16888: Multioutput Single Transistor Forward Converter 150W/100kHz", Application Note AN-TDA 16888-0-010323, Infineon Technologies AG, Mar. 2001, (20 pages).

* cited by examiner

*Primary Examiner*—Adolf Berhane
(74) *Attorney, Agent, or Firm*—Maginot, Moore & Beck

(57) ABSTRACT

A circuit arrangement supplies voltage to a load during normal operation and in a standby mode. The arrangement has the following features:
- input terminals for application of a supply voltage,
- a first converter unit having a power factor converter and a flyback converter connected downstream from it, with the power factor converter producing an intermediate voltage across a capacitive energy storage element during normal operation, and
- a converter unit, which is coupled to the input terminals and produces an output voltage across the first output terminals when in the standby mode, and which has second output terminals which are coupled to the capacitive energy storage element in the PFC.

13 Claims, 3 Drawing Sheets

CIRCUIT ARRANGEMENT FOR SUPPLYING VOLTAGE TO A LOAD

Figure 1:
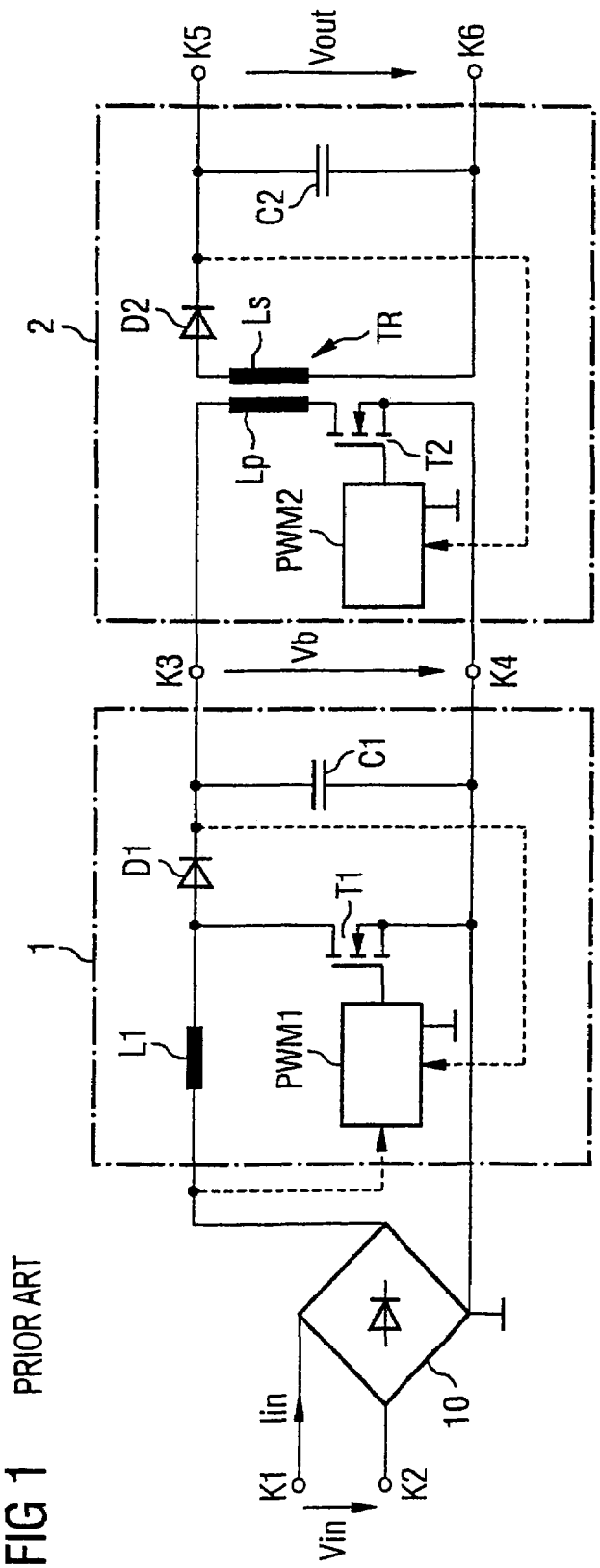

The present invention relates to a circuit arrangement for supplying voltage to a load during normal operation and in the standby mode, having input terminals for the application of an input voltage and having a first converter unit which is coupled to the input terminals and has a power factor correction circuit (Power Factor Controller, PFC) and a converter which is connected downstream from the power factor correction circuit, with the power factor correction circuit producing an intermediate voltage across a capacitive energy storage element, and the switch-mode converter which is connected downstream producing an output voltage, from the intermediate voltage, across the output terminals in order to supply voltage to the load.

Converter units having a power factor correction circuit (PFC) and a downstream switch-mode converter which, for example, is in the form of a flyback converter, have been known for a long time and are described, for example, in "Application note AN-TDA 16888-0-01032", Version 1.1, March 2001, Infineon Technologies AG, Munich. The basic design of a converter unit such as this with a PFC and a downstream switch-mode converter will be explained briefly in the following text with reference to FIG. 1.

The circuit has input terminals K1, K2, for application of an input voltage Vin, which is normally mains AC voltage and is supplied to the power factor correction circuit 1 via a rectifier, normally a bridge rectifier. As illustrated, power factor correction circuits are normally in the form of step-up controllers which produce a DC voltage across output terminals K3, K4 via an output capacitor C1, the amplitude of which DC voltage is higher than the peak value of the input voltage Vin. The step-up controller has a series circuit comprising a coil L1 and a semiconductor switch T1 which, in the example, is in the form of a MOSFET T1, and has a rectifier circuit with a diode D1 and the output capacitor C1, which couples the coil C1 to the output terminals K3, K4. The output voltage Vb which is produced by the power factor correction circuit can in this case be tapped off across the output capacitor C1. The switch T1 is driven in a clocked manner by means of a pulse-width modulator PMW1 in such a way that, firstly, the intermediate voltage Vb is regulated at an at least approximately constant value, and in such a manner that, on the other hand, the waveform of the input current Iin in the converter unit corresponds to the waveform of the input voltage Vin, in order to achieve the maximum real power consumption. Power factor correction circuits, which are used in so-called wide area power supply units, are able to produce an approximately constant intermediate voltage Vb from mains input voltages with root mean square values between 90 V and 270 V.

In order to actually supply a voltage to the load, the power factor correction circuit 1 is followed by a step-down controller 2 which, in the example, is in the form of a flyback converter and has a transformer TR with a primary coil Lp and a secondary coil Ls, with the primary coil Lp being connected in series with a second semiconductor switch T2 between input terminals K3, K4 which correspond to the output terminals of the PFC 1, such that the intermediate voltage Vb is produced across this series circuit. The secondary coil Ls is followed by a rectifier arrangement D2, C2, across whose output terminals K5, K6 an output voltage Vout is produced in order to supply a load, which is not illustrated in any more detail. The semiconductor switch T2 in the flyback converter is driven in a clocked manner by means of a second pulse-width modulator PWM2 as a function of the output voltage Vout, in order to produce a constant output voltage Vout, at least approximately independently of the load.

Converter units such as these with a PFC and a downstream flyback converter are used in particular for supplying voltage to loads which can assume a normal operating mode and a standby operating mode, and whose power consumption may differ greatly between normal operation and standby mode. Legal regulations, on the basis of which the power consumption of loads must not exceed specific limit values when in the standby mode, depending on their power consumption during normal operation, present not inconsiderable requirements for the reduction of the power consumption of the converter unit when in the standby mode. For example, one recommendation from the EU Commission provides that, from 2005, loads with a power consumption during normal operation of up to 75 W must not exceed a maximum power consumption of 0.75 W when in the standby mode.

Figure 2:
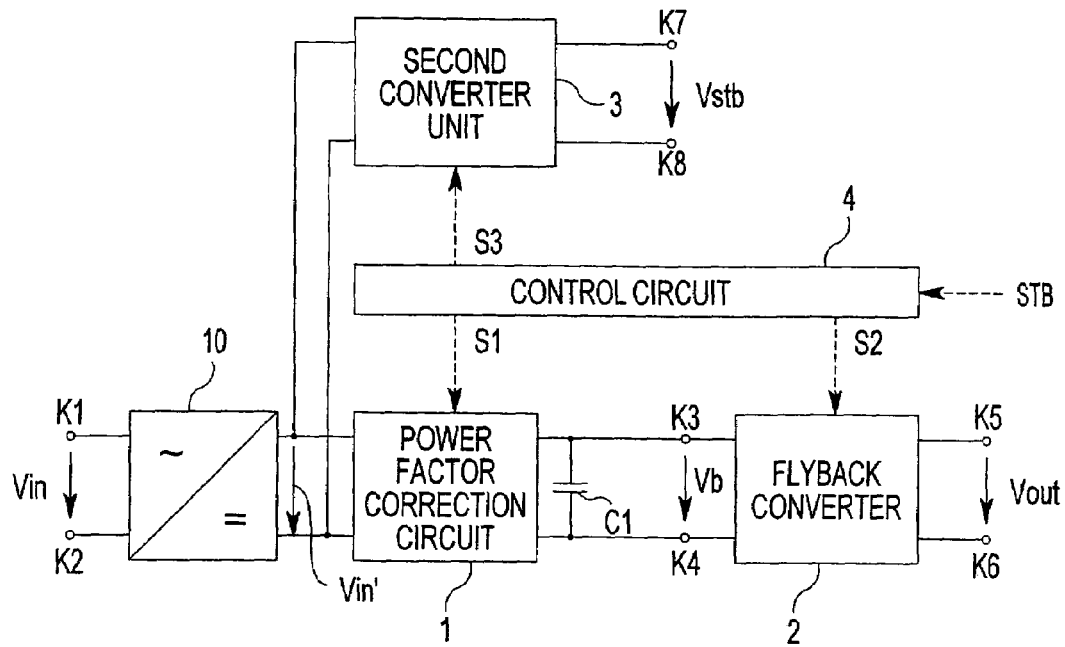

FIG. 2 shows one known concept for a voltage supply circuit for loads during normal operation and in the standby mode. In addition to the abovementioned first converter unit with the power factor correction circuit 1 and the switch-mode converter 2, which ensures that the load is supplied with voltage at output terminals K5, K6 during normal operation of the load, the voltage supply circuit has a second converter unit 3 which, for example, is a step-down controller and is designed only for low power consumption levels in order to supply the load with a standby mode voltage Vstb via output terminals K7, K8 when in the standby mode. This arrangement provides for only one of the two converter units 1, 2 or 3 to be kept in the active operating state, specifically the first converter unit with the power factor correction circuit 1 and the switch-mode converter 2 during normal operation, and the second converter unit 3 when in the standby mode. This activation and deactivation of the two converter units is carried out by a control circuit 4, which activates and deactivates the power factor correction circuit and the downstream switch-mode converter 2 or, respectively, the second converter unit 3, via output signals S1, S2, S3.

Via the power factor correction circuit 1 and the switch-mode converter 2, a circuit such as this ensures an adequate voltage supply to the load during normal operation, with the comparatively high power consumption of the PFC 1 in comparison to the power consumption of the load being less important and, when in the standby mode, ensures an adequate supply to the load with a lower power consumption, by virtue of the design of the second converter unit 3.

This concept has the disadvantage that the intermediate voltage Vb falls to a value which corresponds to the peak value of the input voltage Vin when the power factor correction circuit 1 is switched off, that is to say when the power switch (T1 in FIG. 1) which is contained in it is permanently open. In this case, the flyback converter 2 must be designed to first of all produce the output voltage Vout from this lower intermediate voltage after the transition to normal operation, until the output capacitor C1 has been charged to the desired nominal value of the intermediate voltage Vb by the power factor correction circuit 1 being started up again. If it is remembered in this case that the input voltage Vin in the case of wide area power supply units may vary between 90 V and 270 V (root mean square value), resulting in corresponding variations in the intermediate voltage Vb when the power factor correction circuit 1 is switched off, the flyback converter must be designed for a wide input voltage range, in order to compensate for these fluctuations in its input voltage for the provision of the output voltage Vout at the terminals K3, K4. This results in considerably higher production costs than in the case of a flyback converter which is designed in such a way that it is supplied with an approximately constant input voltage, but which is not subject to major discrepancies and in which smaller, and thus cheaper, active and passive components can be used.

Furthermore, when the output capacitor C1 is being recharged after the power factor correction circuit has been switched on again, high currents can flow which, in poor circumstances, can lead to damage to the step-up controller diode D1.

The aim of the present invention is therefore to provide a circuit arrangement for supplying voltage to a load during normal operation and in the standby mode, which ensures an adequate voltage supply to the load during normal operation and a lower power consumption in the standby mode, and in which the problems mentioned above do not occur.

This aim is achieved by a circuit arrangement as claimed in patent claim 1. Advantageous refinements of the invention are the subject matter of the dependent claims.

The circuit arrangement according to the invention for supplying voltage to a load during normal operation and in the standby mode has input terminals for application of a supply voltage, as well as a first and a second converter unit, which are coupled to the input terminals. The first converter unit has a power factor correction circuit and a switch-mode converter which is connected downstream from the power factor correction circuit, with the power factor correction circuit producing an intermediate voltage across a capacitive energy storage element during normal operation, and the switch-mode converter producing an output voltage, from the intermediate voltage, across output terminals of the first converter unit. When in the standby mode, the second converter unit produces an output voltage across first output terminals of the second converter unit, in order to ensure a voltage supply to the load when in a standby mode. The second converter unit also has second output terminals, which are coupled to the capacitive energy storage element in the power factor correction circuit in the first converter unit, in order to ensure a voltage supply for the capacitive energy storage element, and in order to prevent a major drop in the intermediate voltage across this capacitive energy storage element when in the standby mode. The second converter unit is preferably designed such that, when in the standby mode, it produces a voltage across the second output terminals which corresponds to the intermediate voltage which the power factor correction circuit produces across the capacitive energy storage element during normal operation, thus ensuring that the intermediate voltage does not fall, or falls only insignificantly, even when in the standby mode, when the power factor correction circuit is switched off.

The second converter unit, which is designed in the explained manner, offers the advantage that the switch-mode converter which is connected downstream from the power factor correction circuit need be designed only for an input voltage which is not subject to major fluctuations, as a result of which the switch-mode converter can be produced at low cost. Furthermore, in the case of this circuit, a step-up controller diode in the form of a step-up controller during the formation of the power factor correction circuit is not subject to the heavy current load, which was mentioned initially, during the transition from the standby mode to normal operation when the power factor correction circuit is switched on again.

The second converter unit, which ensures that voltage is supplied to the load from the input voltage when in the standby mode, is preferably a flyback converter, which has a transformer with a primary coil connected in series with a semiconductor switch, and with a first and a second secondary coil, which are inductively coupled to the primary coil, with the first secondary coil being coupled via a rectifier arrangement to the first output terminals of this second converter unit, in order to ensure that voltage is supplied to the load when in the standby mode, and with the second secondary coil being coupled via a second rectifier arrangement and the second output terminals to the capacitive energy storage element in the power factor correction circuit, in order to largely prevent partial discharging of this capacitive energy storage element when in the standby mode. The turns ratios of the primary coil, of the first secondary coil and of the second secondary coil are in this case preferably matched to one another such that, when the supply voltage which is required for the standby mode for the load is produced at the first output terminals of the second converter unit, a voltage which corresponds to the intermediate voltage which the power factor correction circuit produces across the capacitive energy storage element during normal operation is produced across the second output terminals of the second converter unit.

The circuit arrangement has a control circuit which is designed to deactivate the first converter unit, which has the power factor correction circuit and the downstream switch-mode converter, when in the standby mode.

Figure 3:
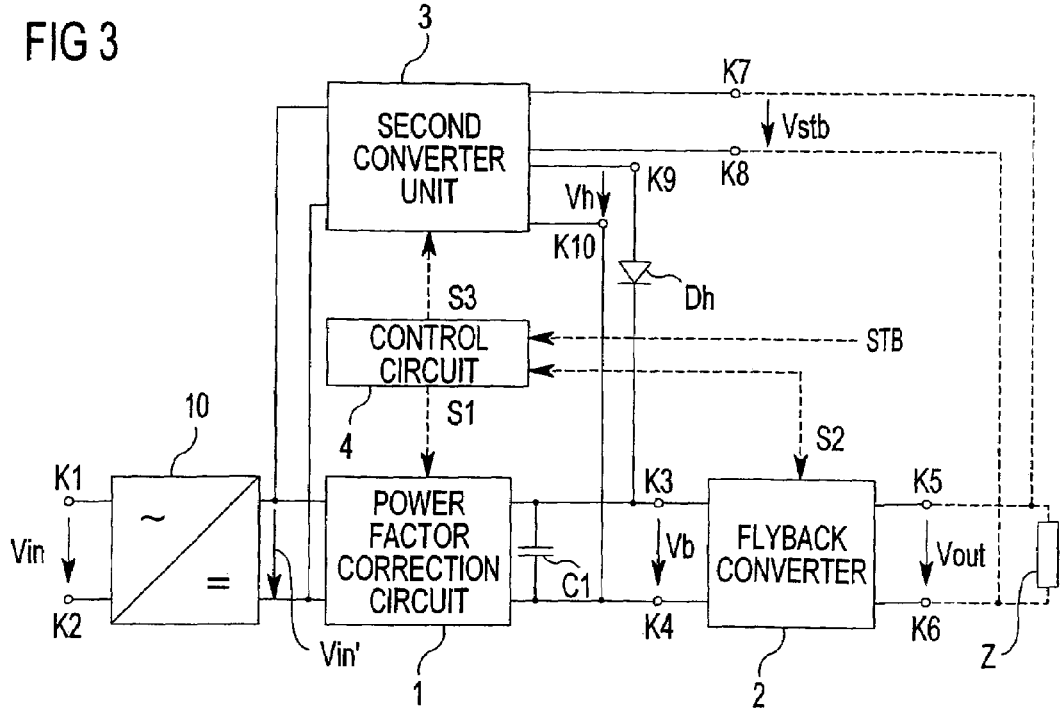
Figure 4:
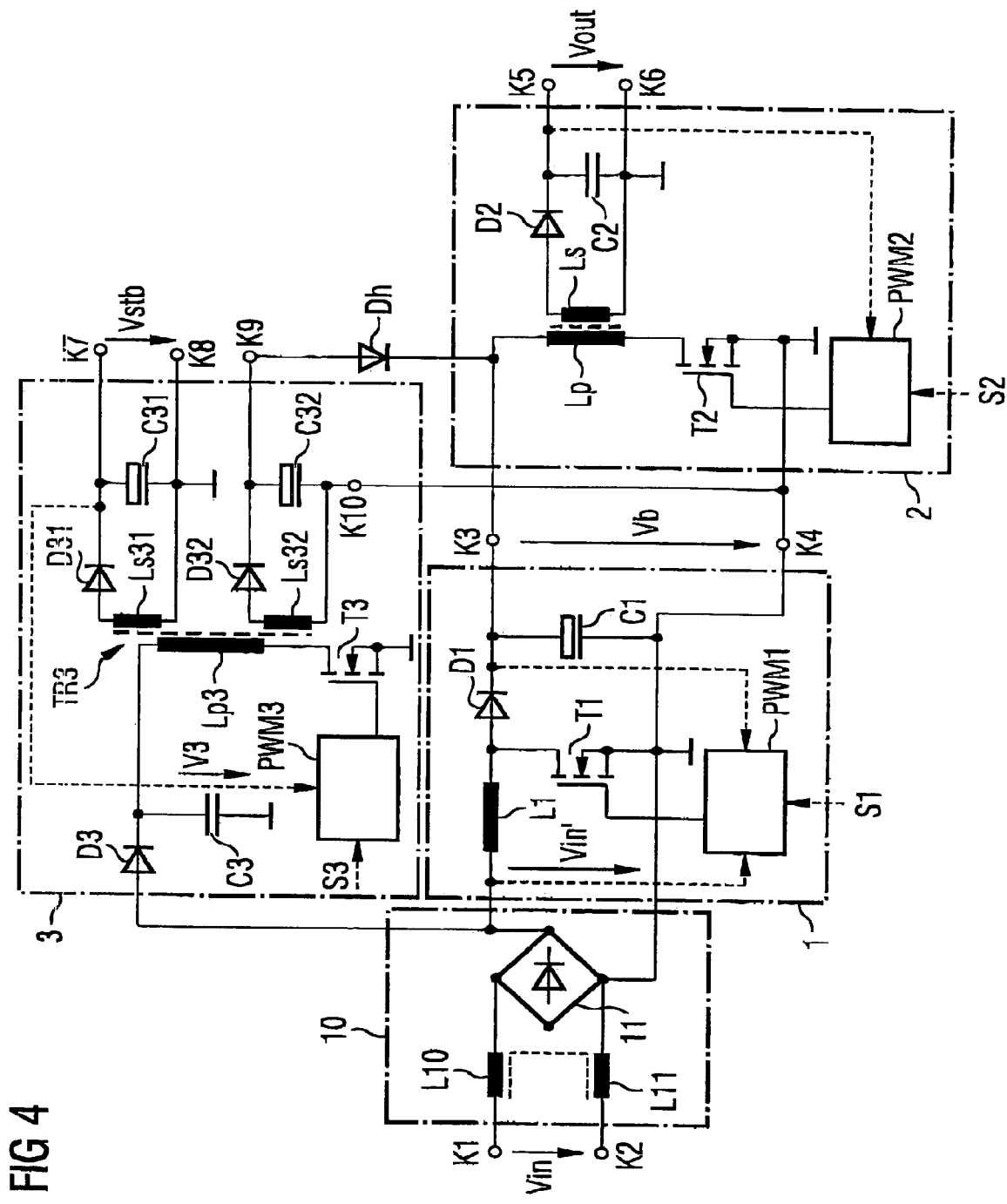

The present invention will be explained in more detail in the following text using exemplary embodiments and with reference to the figures, in which:

FIG. 1 shows a converter unit according to the prior art with a power factor correction circuit and a switch-mode converter which is connected downstream from the power factor correction circuit, FIG. 2 shows a circuit arrangement according to the prior art for supplying voltage to a load, having a first converter unit, which has a power factor correction circuit and a switch-mode converter, for supplying voltage to the load during normal operation, and having a second converter unit for supplying voltage to a load while in a standby mode, FIG. 3 shows a circuit arrangement for supplying voltage to a load, having a first converter unit and having a second converter unit which is coupled to a capacitive energy storage element in the first converter unit, and FIG. 4 shows a circuitry implementation example of a circuit arrangement as shown in FIG. 3.

Unless stated to the contrary, identical reference symbols denote identical parts with the same meaning in the figures.

FIG. 3 shows a block diagram of one exemplary embodiment of a circuit arrangement according to the invention for supplying voltage to a load Z, which is shown by dashed lines in FIG. 3. The circuit arrangement for supplying voltage has input terminals K1, K2 for application of an input voltage Vin, normally from a mains AC voltage with root mean square values between 90 V and 270 V. This AC voltage Vin is rectified by means of a rectifier arrangement 10, for example a bridge rectifier, in order to produce a sinusoidal voltage Vin' from a sinusoidal input voltage Vin. The circuit arrangement has a first converter unit 1, 2, which has already been explained in the introduction, with a power factor correction circuit 1, whose capacitive energy storage element C1 is illustrated explicitly, and with a switch-mode converter 2 which is connected downstream from the power factor correction circuit 1 and produces an output voltage Vout across output terminals K5, K6 of the first converter unit. The circuit arrangement also has a second converter unit 3, which is supplied with the voltage Vin' at the output of the rectifier arrangement 10 and which has output terminals K7, K8, across which a supply voltage Vstb can be produced in order to supply a voltage to the load when in a standby mode. The second converter unit 3 in the exemplary embodiment is connected to the same rectifier arrangement 10 as the first converter unit 1, 2. It should be mentioned that this second converter unit 3 could also be preceded by a separate rectifier circuit, which can be coupled to the input terminals K1, K2.

The circuit arrangement also has a control circuit 4 which, on the basis of a signal STB which indicates normal operation or a standby mode of the load Z, activates or deactivates the first converter unit, that is to say the power factor correction circuit 1 and the switch-mode converter 2 which is connected downstream from the power factor correction circuit 1, and the second converter unit 3, as a function of this state signal STB. If this state signal STB indicates normal operation of the load, then the power factor correction circuit 1 and switch-mode converter 2 are switched on via drive signals S1, S2, with the power factor correction circuit 1 in this operating state producing an intermediate voltage Vb from the rectified input voltage Vin' across output terminals K3, K4 via the capacitive energy storage element C1, which intermediate voltage Vb is preferably greater than the maximum value of the rectified input voltage Vin', and with the downstream switch-mode converter 2 using this intermediate voltage Vb to produce an at least approximately load-independent constant output voltage Vout across output terminals K5, K6 of the first converter unit in the circuit arrangement. During normal operation, the second converter unit 3 may be deactivated, with the output of this second converter unit 3 in this case preferably having a high impedance, in which case the load Z is then supplied by means of the output voltage Vout which is produced by the first converter unit 1, 2. It is also possible for the second converter unit 3 also to be activated during normal operation, that is to say when the first converter unit is switched on, with the first converter unit then carrying a portion of the power that is required by the load.

Although, by way of example in the example shown in FIG. 3, the output terminals K5, K6 of the converter 2 are jointly connected by means of the output terminals K7, K8 to the load Z, it should be mentioned that a switching apparatus, which is not described in any more detail here, can also be provided, which connects the connecting terminals of the load to the first converter 1, 2 during normal operation, and to the second converter 3 when in the standby mode, as a function of the state signal STB. This is particularly advantageous when the second converter 3 produces a different output voltage to that of the converters 1, 2.

If the state signal STB indicates that the load Z is in a standby mode, then the power factor correction circuit 1 and the downstream flyback converter 2 are deactivated, and the second converter unit 3 is activated, with the second converter unit producing a supply voltage Vstb between the first output terminals K7, K8 which is suitable for supplying voltage to the load Z when in the standby mode, and with the second converter unit 3 producing an auxiliary voltage Vh across second output terminals K9, K10, which are coupled to the capacitive energy storage element C1 in the power factor correction circuit 1 via a diode Dh, in order to prevent the capacitive energy storage element C1 from being discharged when in the standby mode.

FIG. 4 shows a circuitry implementation example, in order to assist understanding of this circuit arrangement. In this example, the rectifier arrangement 10 has a bridge rectifier 11 and two suppression coils, which are inductively coupled to one another and are connected between the bridge rectifier 11 and the input terminals K1, K2.

The power factor correction circuit 1 is a step-up controller with a first coil L1, a first power switch T1 and a first diode D1, as well as the output capacitor C1, which has already been explained above and is connected between the output terminals K3, K4. The power switch T1 is driven in a clocked manner by a pulse-width modulator PWM1 on the basis of the intermediate voltage Vb and of the input current to the power factor correction circuit 1, in such a manner that an approximately constant intermediate voltage Vb is produced during normal operation, and such that the waveform of the current consumption corresponds to the waveform of the input voltage Vin or Vin'.

The switch-mode converter 2 which is connected downstream from the power factor correction circuit 1 is in this example a flyback converter, which has a transformer TR with a primary coil Lp and a secondary coil Ls, with the primary coil Lp being connected in series with a second power switch T2, and the series circuit being connected between the output terminals K3, K4 of the power factor correction circuit, which correspond to the input terminals of the switch-mode converter 2. The secondary coil Ls is connected via a rectifier arrangement D2, C2 to the output terminals K5, K6, across which the output voltage Vout in order to supply the load is produced during normal operation. The second power switch T2 is driven in a clocked manner by a second pulse-width modulator PWM2 as a function of the output voltage Vout, in order to produce an at least approximately load-independent output voltage Vout during normal operation.

Like the converter 2, the second converter unit 3 is likewise a step-down controller and, on the input side, has a rectifier arrangement and/or low-pass filter arrangement with a decoupling diode D3 and a capacitor C3, with the rectified low-pass filtered input voltage Vin' being applied via the capacitor C3 as the input voltage V3 to the converter. A series circuit comprising a primary coil Lp3 of a transformer TR3 and a third power switch T3 is connected in parallel with this input capacitor C3. The transformer TR3 has a first secondary coil Ls31 and a second secondary coil Ls32, with the first secondary coil Ls31 being coupled via a first rectifier arrangement D31, C31 to the output terminals K7, K8, and the second secondary coil Ls32 being coupled via a rectifier arrangement D32, C32 to the second output terminals K9, K10. These second output terminals K9, K10 are connected via a diode Dh to the output terminals of the power factor correction circuit 2 and to the input terminals of the flyback converter 2, between which the capacitive energy storage element C1, which is in the form of a capacitor, is connected.

During normal operation, the circuit operates in the manner described above. The power factor correction circuit 1 produces the intermediate voltage Vb across the output capacitor C1, while the diode Dh prevents the output capacitor C1 in the PFC from being discharged via the second converter unit 3.

When in the standby mode, the pulse-width modulator PWM1 is driven via the control signal S1 such that the first power switch T1 is permanently open, and the second pulse-width modulator PWM2 in the flyback converter 2 is driven via the second control signal S2 such that the second power switch T2 is permanently open. Because of the diode D1 at the output of the power factor correction circuit 1, and because the second power switch T2 is open, the charge can admittedly not flow away from the output capacitor C1 via the power factor correction circuit 1 and the flyback converter 2 although, however, the capacitor C1 will be increasingly discharged owing to parasitic losses.

When in this standby mode, the second flyback converter 3 is driven via the control signal S3, in order to produce the standby mode supply voltage Vstb between the output terminals K7, K8 by being opened and closed in a clocked manner. At the same time, the output capacitor C1 is recharged via the second secondary winding Ls32, the rectifier arrangement D32, Ls32 and the diode Dh, in order to compensate for parasitic losses.

The winding ratios of the primary coil Lp3 and of the first and second secondary coil Ls31, Ls32 of the flyback converter 3 are matched to one another such that the auxiliary voltage Vh which is produced between the output terminals K9, K10 corresponds at least approximately to the value of the intermediate voltage Vb which is produced by the power factor correction circuit 1 during normal operation, when the nominal value of the standby mode supply voltage is produced at the output terminals K7, K8. This avoids any need for a separate control loop to regulate the auxiliary voltage Vh.

In the circuit arrangement according to the invention, the flyback converter 2 which is connected downstream from the power factor correction circuit 1 may be designed for an input voltage Vb which is subject to only minor voltages, since the output capacitor C1 in the PFC1 is prevented from being discharged via the second converter unit 3 when in the standby mode, when the PFC1 and the flyback converter 2 are switched off, so that an intermediate voltage Vb which corresponds to the intermediate voltage which is produced by the PFC1 during normal operation is available immediately after the transition to normal operation, that is to say once the PFC1 and the flyback converter 2 have been switched on again.

Finally, it should be mentioned that the second converter unit, which ensures the voltage supply to the load when in the standby mode, need not necessarily be switched off during normal operation, but can also be operated in parallel with the PFC1 and the downstream flyback converter 2. When in the standby mode, at least the PFC1 should be switched off by the first converter unit, since it has a comparatively high power consumption and would thus increase the power consumption of the overall arrangement out of all proportion when in the standby mode.

LIST OF REFERENCE SYMBOLS

1 Power factor correction circuit
2 Flyback converter
3 Second converter unit, flyback converter
4 Control circuit
10 Bridge rectifier
C2 Capacitor
C3 Capacitor
C31, C32 Capacitors
D2 Diode
D3 Diode
D31, D32 Diodes
Dh Diode
Iin Input current
K1, K2 Input terminals
K3, K4 Output terminals of the PFC, input terminals of the flyback converter
K5, K6 Output terminals
K7, K8 First output terminals of the second converter unit
K9, K10 Second output terminals of the second converter unit
L1 Coil
L10, L11 Suppression coils
Lp Primary coil
Lp3 Primary coil
Ls Secondary coil
Ls31, Ls32 Secondary coils.
PFC Power factor controller
PWM1, PWM2 Pulse-width modulators
S1, S2, S3 Control signals
STB Operating state signal
T1, T2 Transistors
TR Transformer
TR3 Transformer
Vb Intermediate voltage
Vh Supply voltage
Vin' Output voltage from the bridge rectifier
Vin Input voltage
Vout Output voltage
Vstb Standby mode supply voltage
Z Load

The invention claimed is:

1. A circuit arrangement for supplying voltage to a load during normal operation and in a standby mode, with the arrangement having the following features:
   input terminals for application of a supply voltage,
   a first converter unit, which is coupled to the input terminals and which has a power factor correction circuit and a switch-mode converter which is connected downstream from the power factor correction circuit, with the power factor correction circuit producing an intermediate voltage across a capacitive energy storage element during normal operation, and the switch-mode converter producing an output voltage from the intermediate voltage, at the output terminals of the first converter unit,
   a second converter unit which is coupled to the input terminals, and which produces an output voltage at first output terminals when in the standby mode,
wherein
the second converter unit has second output terminals, which are coupled to the capacitive energy storage element in the power factor correction circuit for supplying voltage to the capacitive energy storage element when in the standby mode.

2. The circuit arrangement as claimed in claim 1, in which the second converter unit has a switch-mode converter with a semiconductor switch, which is connected in series with a primary coil of a transformer, with the transformer having a first secondary coil which is coupled to the first output terminals, and having a second secondary coil, which is coupled to the capacitive energy storage element in the power factor correction circuit.

3. The circuit arrangement as claimed in claim 2, in which a first rectifier arrangement is connected between the first secondary coil and the first output terminals, and a second rectifier arrangement is connected between the second secondary coil and the capacitive energy storage element.

4. The circuit arrangement as claimed in claim 1, in which the first and second converter units are matched to one another such that the intermediate voltage which is produced across the capacitive energy storage element by the power factor correction circuit during normal operation corresponds at least approximately to the voltage which is produced across the capacitive energy storage element by the second converter unit when in the standby mode.

5. The circuit arrangement as claimed in claim 1, which has a control circuit which is coupled to the first and second converter units and switches the first and second converter units to a first or a second operating state in each case, on the basis of a signal which indicates the standby mode or normal operation.

6. The circuit arrangement as claimed in one of claims 1 to 5, in which the power factor correction circuit has a step-up controller.

7. The circuit arrangement as claimed in claim 1, in which the switch-mode converter, which is connected downstream from the power factor correction circuit, is a step-down controller.

8. The circuit arrangement as claimed in claim 1, in which a rectifier arrangement is connected between the input terminals and the power factor correction circuit.

9. The circuit arrangement as claimed in claim 1, in which a rectifier arrangement is connected between the input terminals and the second converter unit.

10. A circuit arrangement for supplying voltage to a load during normal operation and in a standby mode, the circuit arrangement comprising:
input terminals configured to receive a supply voltage;
a first converter unit coupled to the input terminals, the first converter unit including a power factor correction circuit and a switch-mode converter connected downstream from the power factor correction circuit, with the power factor correction circuit configured to produce an intermediate voltage across a capacitive energy storage element during normal operation, and the switch-mode converter configured to produce an output voltage from the intermediate voltage at the output terminals of the first converter unit; and
a second converter unit coupled to the input terminals, configured to produce an output voltage at first output terminals when in the standby mode, the second converter unit having second output terminals coupled to the capacitive energy storage element in the power factor correction circuit, the second converter unit configured to supply voltage to the capacitive energy storage element when in the standby mode.

11. The circuit arrangement as claimed in claim 10, wherein the second converter unit includes a switch-mode converter having a semiconductor switch connected in series with a primary coil of a transformer, the transformer having a first secondary coil coupled to the first output terminals, and a second secondary coil coupled to the capacitive energy storage element in the power factor correction circuit.

12. The circuit arrangement as claimed in claim 11, wherein a first rectifier arrangement is connected between the first secondary coil and the first output terminals, and a second rectifier arrangement is connected between the second secondary coil and the capacitive energy storage element.

13. The circuit arrangement as claimed in claim 10, wherein the first and second converter units are matched to one another such that the intermediate voltage which is produced across the capacitive energy storage element by the power factor correction circuit during normal operation corresponds at least approximately to the voltage which is produced across the capacitive energy storage element by the second converter unit when in the standby mode.

* * * * *